Figure 1:
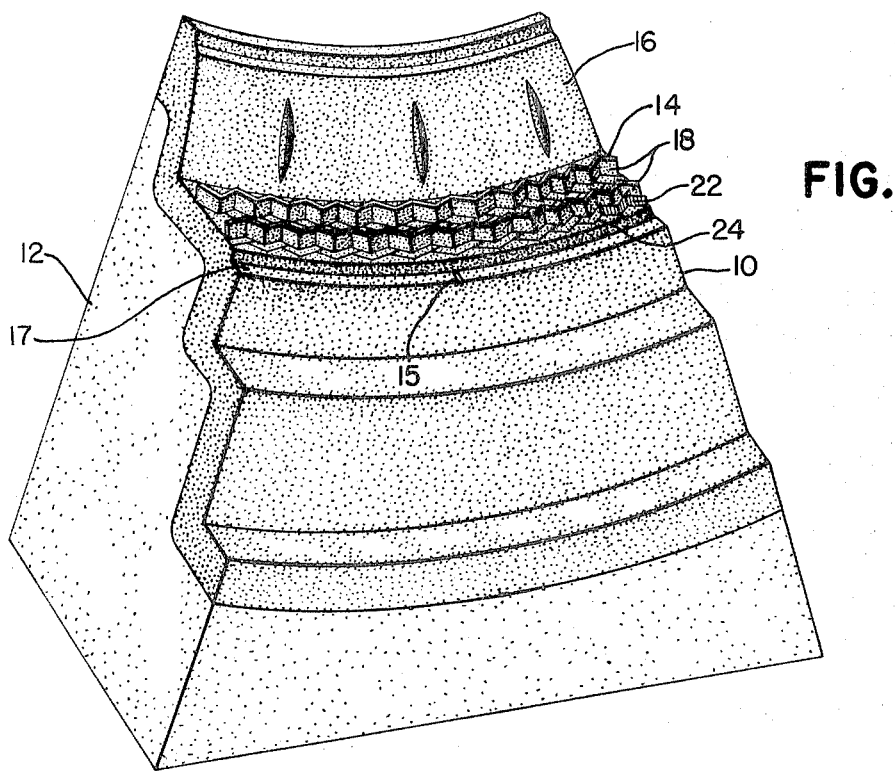

United States Patent
McDonald

[11] 3,840,971
[45] Oct. 15, 1974

[54] METHOD OF MAKING A SAND MOLD FOR CASTING TREAD RINGS UTILIZED IN TIRE MOLDS

[75] Inventor: Edward A. McDonald, Cuyahoga Falls, Ohio

[73] Assignee: The Goodyear Tire & Rubber Company, Akron, Ohio

[22] Filed: Dec. 30, 1971

[21] Appl. No.: 214,118

[52] U.S. Cl. ............... 29/407, 164/17, 164/137, 29/455
[51] Int. Cl. ............................................. B22c 9/28
[58] Field of Search ......... 164/17, 43, 24, 161, 137; 264/162, 219–221; 29/428, 407, 455

[56] References Cited
UNITED STATES PATENTS

| | | |
|---|---|---|
| 2,560,052 | 7/1951 | Miller et al. .................... 164/17 X |
| 2,836,867 | 6/1958 | Bean ................................ 164/24 |
| 2,914,823 | 12/1959 | Bean ............................. 164/332 X |
| 2,937,421 | 5/1960 | Taccone ......................... 164/161 |
| 2,982,998 | 5/1961 | Smith et al. .................... 164/24 X |
| 3,255,500 | 6/1966 | Engel et al. ...................... 164/43 |
| 3,387,645 | 6/1968 | Beckhoven ...................... 164/17 |
| 3,709,282 | 1/1973 | Taccone ........................ 164/40 X |

Primary Examiner—Robert D. Baldwin
Attorney, Agent, or Firm—F. W. Brunner; M. L. Gill

[57] ABSTRACT

A method of making a sand mold for casting tread rings utilized in tire molds in which molding sand is poured over a flexible pattern to form a mold portion in a general shape of a truncated sector. The mold portion is removed from the flexible pattern before the sand is completely hardened and is then shaved and fitted to other similarly shaped segments as required to form a complete circular sand mold.

7 Claims, 7 Drawing Figures

PATENTED OCT 15 1974 3,840,971

SHEET 1 OF 3

PATENTED OCT 15 1974　　　　　　　　　　3,840,971

SHEET 2 OF 3

METHOD OF MAKING A SAND MOLD FOR CASTING TREAD RINGS UTILIZED IN TIRE MOLDS

This invention relates to a method of making sand molds, and in particular to a novel and improved method of making sand molds for casting tire tread mold rings and utilizing a flexible pattern.

It has been common to utilize a cast aluminum tread ring, or matrix, in a tire mold for forming the tread portion of a pneumatic tire during the curing operation. These circular tread rings, or tread matrices, are made by pouring molten aluminum into a plaster mold. The plaster mold is formed, at least in part, by first making a rubber or flexible pattern. The plaster is then poured on the flexible pattern and permitted to harden to form a plaster mold section in the form of a truncated sector. Once the plaster is hardened, it is removed from the flexible pattern. If there is a reverse draft portion in the pattern, it can still be removed since the plaster is hardened and the rubber is sufficiently flexible to give in order to permit withdrawal of the mold. The truncated sector shaped portion of the plaster mold is then fitted together with other similar shaped portions to form a complete ring. Any necessary trimming of the sides of the sectors in order that they fit neatly into a complete ring can be accomplished by shaving the sides, since the plaster is somewhat soft.

With the advent of belted tires, and in particular radial ply tires, the aluminum tread ring has become somewhat inadequate since the very rigid tread portion in some instances can tend to damage the aluminum tread ring when the tire is removed from the mold. It, therefore, has become desirable to provide either cast iron or cast steel tread matrices, or tread rings. Due to the high density and high melting point of cast iron and cast steel, it is impossible to form or cast such tread rings in the old plaster molds. It has, therefore, become desirable to provide a method of forming a mold for casting such high strength tread rings.

It is a primary object, therefore, of this invention to provide a method of making a circular sand mold for casting tread rings used in molding tires.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 2:
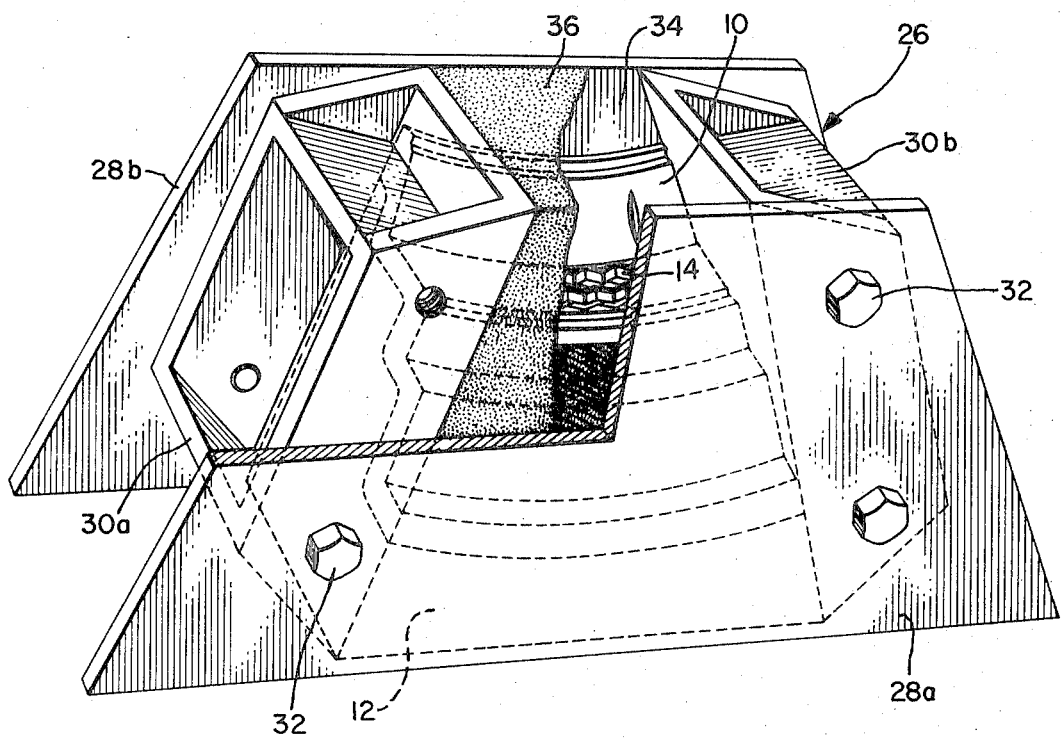
Figure 3:
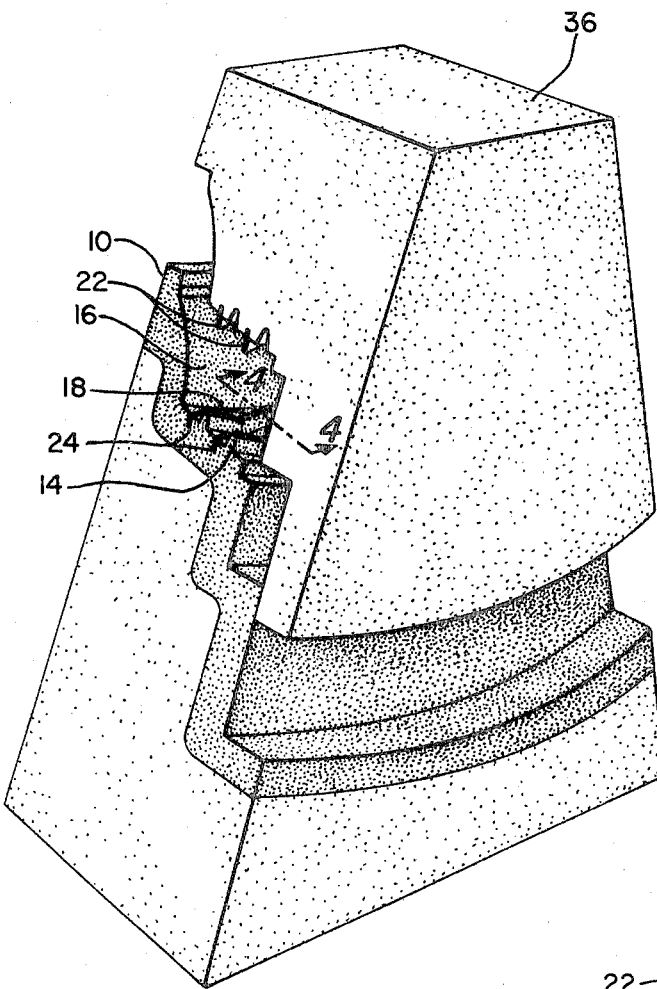
Figure 4:
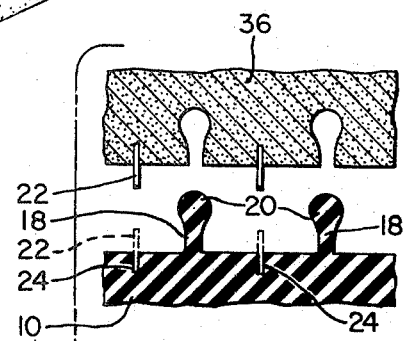
Figure 7:
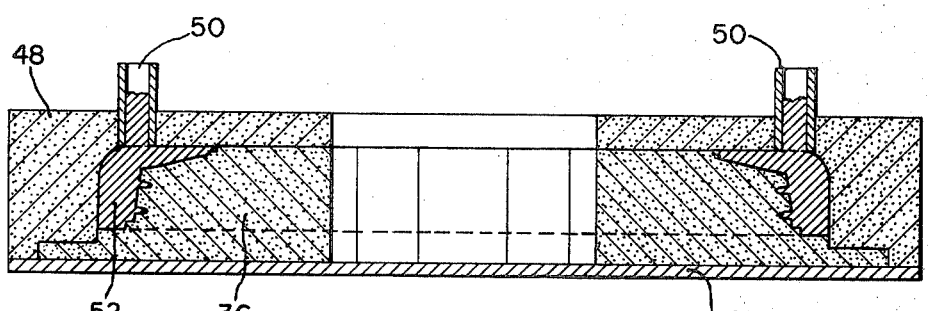
Figure 5:
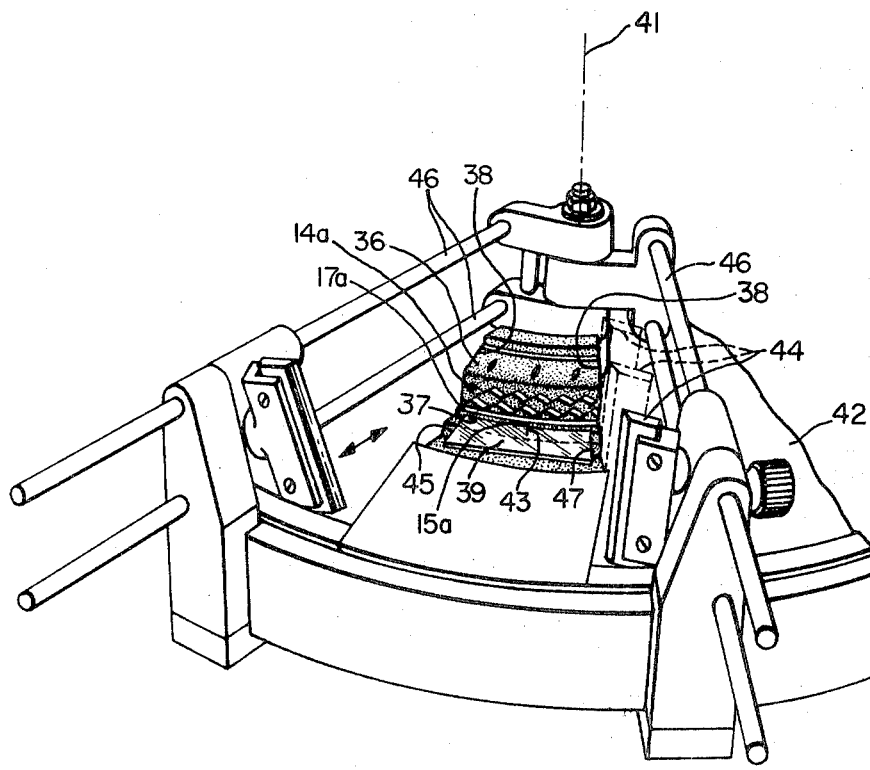
Figure 6:
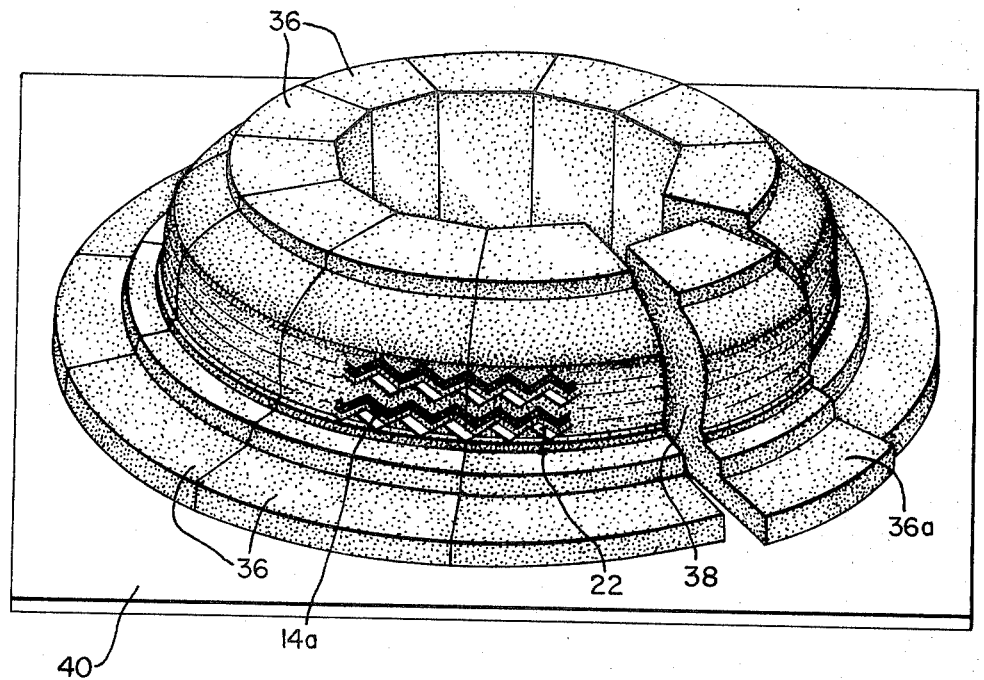

In the drawings:

FIG. 1 is a perspective view of a flexible pattern utilized in conjunction with the present invention, FIG. 2 is a perspective view with portions cut away of an assembly including the flexible pattern and a form box enclosing the pattern and filled with molding sand, FIG. 3 is a perspective view of the sand mold being removed from the flexible pattern, FIG. 4 is an enlarged partial sectional view of the flexible pattern taken substantially along lines 4—4 of FIG. 3 and illustrating the removal of the mold from the pattern, FIG. 5 is a perspective view of an apparatus used to trim the sides of a truncated sector portion of a sand mold, FIG. 6 is a perspective view illustrating the fitting of the various truncated sectors of the sand mold, and FIG. 7 is a cross-sectional view of a completed sand mold with the cavity filled with metal to form the tread ring.

With reference to the drawings and in particular FIG. 1, there is illustrated a flexible rubber pattern 10 mounted on a rigid base 12. The flexible pattern 10 is basically a negative of a portion of the desired finished tire tread and includes a tread pattern portion 14 and an upper sidewall portion 16. The tread portion 14 and upper sidewall portion 16 being a negative of the desired finished tire have a surface contour of the same size, shape and configuration as is desired in the finished cast steel tread ring. A centering mark or groove 15, the purpose of which will be explained later, is provided in the ridge or step-off 17 adjacent the tread pattern 14.

The tread pattern portion 14 includes a series of narrow ribs 18 extending from the pattern 10 and a series of thin metal blades 22. For purposes of clarity only two blades are illustrated. As best seen in FIG. 4, these ribs 18 may have a bulbous outer portion 20 when viewed in cross-section resulting in what is referred to as a reverse draft portion, which must be either disassembled, destroyed or deformed in order to permit removal of the mold from the pattern. The rubber utilized to make the flexible pattern 10 is flexible enough to permit removal of the ribs from the sand mold. Further, a series of thin metal blades 22 are inserted into slots 24 in the pattern 10. These blades 22, best seen in FIG. 4, are transferred from the rubber pattern to the sand mold when the sand mold is removed from the pattern. These same blades are later anchored in the cast steel or cast iron tread ring to form thin slits known as sipes in the tire tread pattern. The rubber utilized in the pattern 10 is sufficiently rigid to support the weight of molding sand and the force of ramming or packing the sand thereabout without deforming the ribs 18 or dislocating the blades 22. Yet, as noted before, it is still sufficiently flexible to permit removal of the sand mold from the pattern even if there is a reverse draft configuration.

As seen in FIG. 2, a form box generally illustrated at 26, including front and back sides 28a and 28b, and side plates 30a and 30b, is clamped rigidly around the rigid base 12 and flexible pattern 10 by means of bolts 32. This form box 26 forms a truncated sector shaped cavity 34 above the flexible tread pattern 10 with the arcuate tread pattern 14 forming a curved surface near the wide part of the truncated sector configuration. Although a truncated sector shape is preferred, it is possible to provide a sector shaped cavity. Molding sand comprised of sand and binder mix is poured over the flexible pattern and rammed tightly therein until the cavity 34 is completely filled. The sand and binder mix is then allowed to partially harden.

In accordance with the present invention and as illustrated in FIG. 3, the box 26 is removed and the sand mold sector 36 is lifted from the flexible elastic pattern at a predetermined time before the sand is completely hardened. As seen in FIG. 4, the blades 22 that had been previously inserted into the slots 29 in the flexible pattern 12 adhere to the truncated sand mold sector 36 and are withdrawn therewith from the flexible pattern 10.

The individual sections 36 of the sand mold are immediately placed in a jig 42 illustrated in FIG. 5. A preformed template 39 having an arcuate surface 37 is placed against the ridge 17a of the sand mold segment 36 with its centering mark 43 adjacent the centering mark 15a to center the template 39 relative to the tread pattern portion 14a of the truncated sand mold sector. A mark is placed on the ridge 17a at opposite ends 45, 47 of the template 39 to indicate how much of the truncated sector 36 must be removed in order that it will fit together with other similar truncated sectors to make a perfect circle for forming the tread ring. Quite unexpectedly the truncated sector can be shaped even though it is made of sand. The use of such a template is desirable since the time in which the segment can readily be trimmed is limited, and it is desirable to expedite the trimming operation.

A metal blade 44 is slidably mounted on a pair of rods 46 for radial movement with respect to the truncated sector shaped portion of the mold 36 mounted in the jig 42. The rods 46 can be rotated about the central axis 41 of the truncated sector 36 to permit adjustment of the cut taken from the portion 36. The amount of cut taken is exaggerated in FIG. 5. for purposes of illustration. The blade 44 is then moved radially inwardly, as seen in dashed lines, to scrape a layer off the sides 38 of the sand mold 36. For purposes of this invention the side of a truncated sector shaped portion shall be the side 38 which is substantially perpendicular to the plane of the radii forming the segment and contains one of these radii. The truncated sectors are fitted together on a base plate 40 as seen in FIG. 6. The last truncated sector 36a is fitted to the ring and then placed back on the jig 42, if necessary, for additional shaving to form a complete ring. The packing of the forming boxes as illustrated in FIG. 2 should be timed such that they are sequentially ready for shaving and fitting since as the truncated sectors continue to harden shaving becomes increasingly more difficult.

As seen in FIG. 7, a form box or cope 48, made of sand in a known manner and including a plurality of risers 50, is placed over the entire ring assembly. Molten metal is then poured into the cavity to form the tread mold ring. When the metal tread ring 52 is solidified the sand mold is broken and washed away, leaving a tread ring having a tread pattern therein including the metal blades 22 for forming the sipes or blading pattern in the tire.

It has been stated that the sand mold is removed from the flexible pattern prior to complete hardening of the sand mold. In this regard the timing of the removal of the sand mold from the pattern will depend upon the specific sand and binder mix utilized as well as the temperature at which the mold is maintained while in the pattern. It is necessary, however, to remove the sand mold from the pattern at a time at which the hardening has progressed to a sufficient degree to permit such removal without damaging the sand mold. It must, however, be removed soon enough to permit the trimming or shaving of the sides of the truncated sector in order to assure a sand mold having an outer surface in the form of a perfect circle. The time, of course, will depend upon the specific materials utilized.

In a specific example, Lino Cure AW30 No Bake Binder System, manufactured and sold by Ashland Chemical Companies (see also U.S. Pat. No. 3,255,500) was utilized in conjunction with silica sand. As recommended by the manufacturer, this binder system has a working time of 30 minutes and a stripping time of about 60 minutes. Working time is the period of time from the mixing of the sand and binder mix in which the mixture is soft enough to ram into the form box. Stripping time is the time from the mixing of the sand and binder mix after which the manufacturer recommends removal of the sand mold from the pattern. This mix is an oil base binder mix which cures at room temperatures which may be between 45° and 120° F., but more usually are between 60° and 90° F. In this example the sand and binder mix were combined and rammed in the form 26 against the flexible pattern 10, which took about 15 minutes. The mold was then permitted to harden for about an additional 25 minutes. Immediately thereafter the sand mold segment was removed from the pattern without damage to the sand mold and fitted into the complete ring by placing it on the baseplate 40 and, as required, moving it to the jig 42 for shaving the sides 38. The entire operation utilizing this specific binder system was conducted at a room temperature of about 73° F. As noted above, it was found that the sides of the mold can be shaved or trimmed by ordinary methods, even though the mold was formed of sand and normally would not be expected to be workable after removal from the pattern.

While in the above described specific example the individual segments 36 were separately fitted to the ring and then moved to the jig, it is recommended for efficiency reasons that the segments be placed immediately on the jig 42 and the amount of cut from the sides of the truncated sector shaped segment determined utilizing the template 39 described above. In this way only the last segment 36a need be fitted to the ring before being placed in the jig for shaving.

As noted before the specific time for removing the sand mold prior to complete hardening of the sand will depend upon the sand and binder mix used and the temperature at which it is used. In determining the predetermined time for a specific situation, it is recommended that the sand mold be removed from the pattern after about two-thirds of the stripping time has elapsed. If the sand mold does not have sufficient strength, the time in the pattern box will have to be increased. If, on the other hand, the sand mold is too hard to be shaved, it should be removed from the pattern sooner.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a sand mold for casting a ring-like metal object comprising pouring sand and binder mix in a pattern to form a truncated sector, leaving said truncated sector in said pattern until said sector is hardened sufficiently to permit removal of said sector from said pattern without damaging said sector, removing said sector from said pattern at a predetermined time before said sand and binder mix is completely hardened, then trimming at least one side of said sector and fitting said sector with a plurality of similarly shaped sectors to form a circular mold, and making a plurality of said sectors in timed sequential steps to permit trimming of said sectors before they become completely hardened.

2. A method as claimed in claim 1, wherein said sand and binder mix are poured over a flexible pattern to permit removal of said sector from said pattern before said sand and binder mix are completely hardened without damaging said section.

3. A method as claimed in claim 2 further including placing a cope half over said circular mold to form a ring-like cavity therewith for forming a metal ring.

4. A method as claimed in claim 1, in which a template is placed adjacent said sector in a predetermined position to determine the extent to which said side is to be trimmed.

5. A method as claimed in claim 4, and utilizing an oilbased binder wherein said sector is maintained in an atmosphere having a temperature between 45° and 120° F. while said sector is on said pattern.

6. A method as claimed in claim 4, and utilizing an oilbased binder wherein said sector is maintained in an atmosphere having a temperature between 60° and 90° F. while said sector is on said pattern.

7. A method as claimed in claim 3, and utilizing an oilbased binder wherein said sector is maintained in an atmosphere having a temperature between 60° and 90° F. while said sector is on said pattern.

\* \* \* \* \*